(12) United States Patent
Berenguer et al.

(10) Patent No.: US 7,553,359 B2
(45) Date of Patent: Jun. 30, 2009

(54) STABLE LIQUID FORMULATIONS OF ANIONIC DYES

(75) Inventors: Jordi Berenguer, El Prat de Llobregat (ES); Ludwig Hasemann, Muellheim-Niederweiler (DE); Joan Bosch, El Prat de Llobregat (ES); Susana Basolas, Barcelona (ES)

(73) Assignee: Clariant Finance (BVI) Limited, Tortola (VG)

( * ) Notice: Subject to any disclaimer, the term of this patent is extended or adjusted under 35 U.S.C. 154(b) by 349 days.

(21) Appl. No.: 11/596,941

(22) PCT Filed: May 12, 2005

(86) PCT No.: PCT/IB2005/001400

§ 371 (c)(1),
(2), (4) Date: Nov. 17, 2006

(87) PCT Pub. No.: WO2005/113684

PCT Pub. Date: Dec. 1, 2005

(65) Prior Publication Data
US 2008/0194815 A1  Aug. 14, 2008

(30) Foreign Application Priority Data
May 19, 2004   (EP) ................... 04011857

(51) Int. Cl.
*C09D 11/02* (2006.01)
*C09B 31/08* (2006.01)

(52) U.S. Cl. ............... 106/31.52; 106/31.48; 106/31.5; 8/681; 8/687

(58) Field of Classification Search ............ 106/31.52, 106/31.48, 31.5; 8/681, 687
See application file for complete search history.

(56) References Cited

U.S. PATENT DOCUMENTS 4,058,517 A * 11/1977 Bermes ............... 534/581
4,654,045 A * 3/1987 Rowe ............... 8/527
5,211,719 A * 5/1993 Kaser ............... 8/681
5,225,545 A * 7/1993 Lauk ............... 534/829
5,288,294 A * 2/1994 Kaser ............... 8/687
5,370,730 A * 12/1994 Gregory et al. ........ 106/31.52
5,559,217 A * 9/1996 Kaser ............... 8/681
5,795,970 A * 8/1998 Ono et al. ............ 534/573
6,194,554 B1 * 2/2001 Mennicke et al. ....... 106/31.52
2007/0083040 A1 * 4/2007 Hasemann ............ 534/622

FOREIGN PATENT DOCUMENTS

| EP | 0 276 534 A | 8/1988 |
| EP | 0 565 286 A | 10/1993 |
| EP | 0 761 771 A | 3/1997 |
| EP | 1 350 820 A | 10/2003 |
| JP | 02 127483 A | 5/1990 |
| JP | 10 292140 A | 11/1998 |
| JP | 2003 246950 A | 9/2003 |

OTHER PUBLICATIONS

English Abstract for JP 02 127483, May 1990.
English Abstract for JP 10 292140, Nov. 1998.
English abstract for JP 2003 246950, Sep. 2003.
PCT International Search Report for PCT/IB2005/001400, dated Aug. 12, 2005.
PCT Written Opinion of the International Searching Authority for PCT/IB2005/001400, dated Aug. 12, 2005.

* cited by examiner

*Primary Examiner*—Helene Klemanski
(74) *Attorney, Agent, or Firm*—Tod A. Waldrop

(57) ABSTRACT

The present invention concerns concentrated aqueous solutions of anionic disazo dyes, comprising salts and or the free acids of anionic dyes of the formula

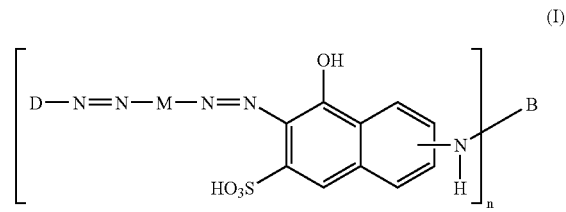

and 2-(2-butoxyethoxy) ethanol wherein the substituents are each as defined in claim 1 and the use of these solutions for dyeing and/or printing hydroxyl-containing substrates and for producing inkjet inks.

11 Claims, No Drawings

STABLE LIQUID FORMULATIONS OF ANIONIC DYES

The present invention concerns concentrated storage-stable aqueous dye solutions, especially concentrated storage-stable aqueous dye solutions comprising anionic disazo dyes. The invention further concerns the use of the present invention's concentrated dye solutions, if appropriate after dilution with water, especially for dyeing and printing paper, including card and board. The invention likewise concerns the production of printing inks, especially inkjet printing inks, by using the concentrated dye solutions of the present invention.

Industrial dyeing and printing is customarily carried out in an aqueous medium. So pulverulent dyes first have to be dissolved, usually in warm or hot water, to be able to use them for printing and dyeing.

Metering systems have been developed in recent years to control the addition of dye by weighing or volumetrically, and they often require stable dye solutions instead of powders and granules.

Such dye solutions also have the advantage that they do not dust and do not require costly dissolving operations.

Such solutions should possess a certain stability, so that they do not precipitate during transportation or storage. Typically, they should be stable for a prolonged period between zero and five degrees Celsius, but also at around 50° C. Similarly, frozen solutions shall be stable after thawing and should not present any stability problems during pumping. Solutions containing precipitates can cause disruptions in pumping or metering systems and lead to unacceptable machine shutdowns and costly cleaning and maintenance.

The present invention accordingly provides concentrated aqueous solutions of anionic disazo dyes, comprising salts and or the free acids of anionic dyes of the formula

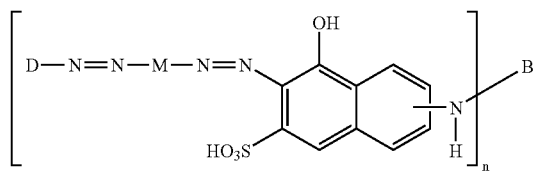

(I)

where
D is a radical of the formula (a)

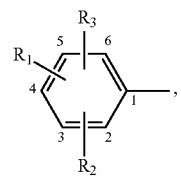

(a)

where
$R_1, R_2, R_3$, are independently H; $C_{1-4}$alkyl; $C_{1-4}$alkoxy, —$SO_3H$; —OH or —CN; or independently —$SO_2$—Y or —O—Y, wherein Y is an unsubstituted $C_{1-4}$alkenyl group or an unsubstituted $C_{1-4}$alkyl group or wherein Y is an NC—, HO—, $HOSO_3$—, halogen-substituted $C_{1-4}$-alkenyl group or an NC—, HO—, $HOSO_3$—, halogen-substituted $C_{1-4}$alkyl group or Y is —$NR_{11}R_{12}$ where $R_{11}$ and $R_{12}$ are independently H, $C_{1-4}$alkyl or substituted $C_{1-4}$alkyl or combine with the interjacent nitrogen to form a five- or six-membered ring which may comprise one or two or three heteroatoms (one or two N, O or S atoms in addition to the nitrogen), in which case the heterocyclic ring is unsubstituted or the heterocyclic ring is substituted by one or two $C_{1-4}$alkyl groups, or D is a bicyclic ring system which may be substituted with $C_{1-4}$alkoxy, —$SO_3H$; —OH or —CN; or independently —$SO_2$—Y or —O—Y, wherein Y is an unsubstituted $C_{1-4}$alkenyl group or an unsubstituted $C_{1-4}$alkyl group or wherein Y is an NC—, HO—, $HOSO_3$—, halogen-substituted $C_{1-4}$-alkenyl group or an NC—, HO—, $HOSO_3$—, halogen-substituted $C_{1-4}$alkyl group or Y is —$NR_{11}R_{12}$ where $R_{11}$ and $R_{12}$ are each as defined above, wherein each of the rings can independently be a five-membered or six-membered ring and these five- or six-membered rings, which may include one or two or three heteroatoms (one or two N, O or S atoms in addition to nitrogen) and this bicyclic ring system is not further substituted by substituents attached via azo groups, and M is a bridging phenyl group which may be unsubstituted or substituted by $C_{1-4}$alkyl, $C_{1-4}$alkoxy, hydroxyl, carboxyl, sulpho, cyano or halogen, and when n=1 B is hydrogen, an unsubstituted aryl radical, a substituted aryl radical, or a substituted triazine derivative having the formula

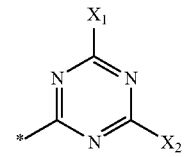

where $X_1$ and $X_2$ are independently unsubstituted amine —$NH_2$ or substituted amine —$NR_{21}R_{22}$ where $R_{21}$ and $R_{22}$ independently have the following meanings: H, $C_{1-4}$alkyl or substituted $C_{1-4}$alkyl, or combine with the interjacent nitrogen to form a five- or six-membered ring which one or two or three heteroatoms (one or two N, O or S atoms in addition to the nitrogen), in which case the heterocyclic ring is unsubstituted or the heterocyclic ring is substituted by one or two $C_{1-4}$alkyl groups or when n=2 B is a bridge of the formula

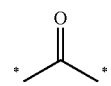

or a bridge of the formula

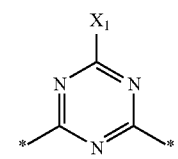

where $X_1$ is as defined above and 2-(2-butoxyethoxy) ethanol.

Alkyl as used herein is to be understood as meaning generally straight-chain or branched alkyl groups. These preferably have 1 to 4 carbon atoms. They are for example methyl, ethyl, n-propyl, i-propyl, n-butyl, i-butyl, sec-butyl or tert-butyl.

Suitable alkoxy radicals are preferably those having 1 to 4 carbon atoms, for example methoxy, ethoxy, n-propoxy, iso-propoxy, n-butoxy, iso-butoxy, sec-butoxy or tert-butoxy.

Suitable substituents for arylradicals and/or phenyl radicals are $C_{1-4}$alkyl, $C_{1-4}$alkoxy, hydroxyl, carboxyl, sulpho, cyano or halogen.

Halogen is fluorine, bromine, iodine or chlorine. Chlorine is the preferred halogen.

The aryl radicals constitute aromatic carbocyclic or heterocyclic radicals and can also be for example bicyclic, for example pyridyl, naphthyl or phenyl. Phenyl is particularly preferred. In the case of a bicyclic ring system each of the rings may independently be a five-membered or six-membered ring and these five- or six-membered rings, which may include one or two or three heteroatoms (one or two N, O or S atoms in addition to the nitrogen), can be further substituted like the monocyclic substituents by $C_{1-4}$alkyl; $C_{1-4}$alkoxy, —$SO_3H$; —OH or —CN; or independently —$SO_2$—Y or —O—Y, wherein Y is an unsubstituted $C_{1-4}$alkenyl group or an unsubstituted $C_{1-4}$alkyl group or wherein Y is an NC—, HO—, $HOSO_3$—, halogen-substituted $C_{1-4}$alkenyl group or an NC—, HO—, $HOSO_3$—, halogen-substituted $C_{1-4}$alkyl group or Y is —$NR_{11}R_{12}$ where $R_{11}$ and $R_{12}$ are independently H, $C_{1-4}$alkyl or substituted $C_{1-4}$alkyl or combine with the interjacent nitrogen to form a five- or six-membered ring which may comprise one or two or three heteroatoms (one or two N, O or S atoms in addition to the nitrogen), in which case the heterocyclic ring is unsubstituted or the heterocyclic ring is substituted by one or two $C_{1-4}$alkyl groups.

Suitable anionic disazo dyes are preferably those of the formula

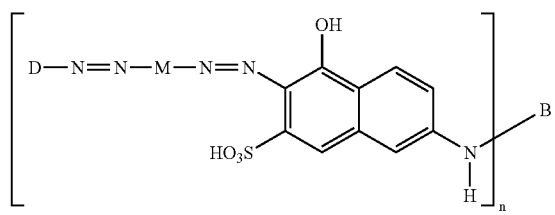

(I')

where the substituents are each as defined above.

In a preferred embodiment the substituents have the following meanings:

D is a radical of the formula (a')

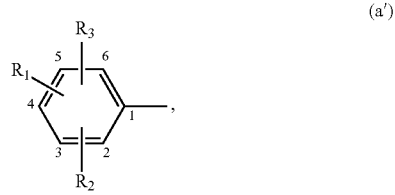

(a')

where $R_1$, $R_2$, $R_3$, are independently H; $C_{1-4}$alkyl $C_{1-4}$alkoxy; —$SO_3H$; —OH or —CN;

M is a bridging phenyl group which may be unsubstituted or substituted by $C_{1-4}$alkyl, $C_{1-4}$alkoxy; sulpho, carboxyl, hydroxyl and B is H, an unsubstituted phenyl group or substituted phenyl group or a substituted triazine derivative of the formula

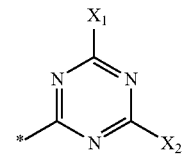

where $X_1$ and $X_2$ are independently as defined above and n=1.

By preference B is H, an unsubstituted phenyl group or substituted phenyl group.

Very particular preference is given to anionic disazo dyes of the formula (I') where D is a phenyl group of the formula (a'')

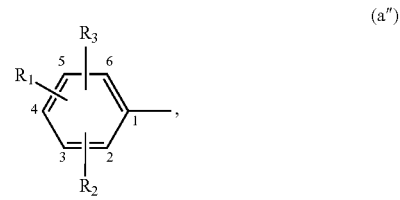

(a'')

where $R_1$, $R_2$, $R_3$, are independently H; $C_{1-2}$alkyl; $C_{1-2}$alkoxy; —$SO_3H$; M is a bridging phenyl group by $C_{1-2}$alkyl, $C_{1-2}$alkoxy and sulpho substituted can be and B is an unsubstituted phenyl group and n=1

In particularly preferred anionic disazo dyes there is a sulpho group in the phenyl group D. In particularly preferred anionic disazo dyes the alkyl groups are methyl groups and the alkoxy groups are methoxy groups.

In particularly preferred anionic disazo dyes the middle component is a para-substituted phenyl group, i.e. bridging in position 1-4.

The solutions according to the present invention may comprise further components such as for example water-soluble organic solubilizers and/or biocides.

Suitable water-soluble organic solubilizers are for example urea, formamide, dimethylformamide, water-miscible polyhydric alcohols such as ethylene glycol, propylene glycol, glycerol, alkanolamines such as ethanolamine, triethanolamine. The preferred water-soluble organic solubilizer is triethanolamine.

The suitable water-soluble organic solubilizers are added in an amount of 0% to 15% by weight, more preferably in an amount of 2% to 10% by weight and most preferably in an amount of 3% to 6% by weight.

Any biocide is suitable. But preference is given to using biocides having FDA and/or BGVV approval. Any biocide capable of controlling the growth of Gram-positive or Gram-negative bacteria, yeasts or fungi can be used in the solutions of the present invention. Suitable biocides are for example thiazol-3-one derivatives, for example alkyl and/or chlorinated thiazol-3-one derivatives or mixtures thereof. Typically, the biocides are used in an amount of 15 parts by weight per million parts of the composition (ppm) up to 1000 ppm; particular preference is given to 50 ppm to 500 ppm (parts by weight per ready-produced composition).

The concentrated solutions of the present invention are generally produced by stirring the free dye acids with a mixture of water and 2-(2-butoxyethoxy) ethanol until a homogeneous solution forms.

The amount of polyglycolamine in the mixture can vary within wide limits, so that (relative to the amount required for complete salt formation) a deficiency or excess can be present. Preferably, however, at least the amount required for complete salt formation is used.

The stable solutions of the present invention comprise preferably not less than 10% by weight of (2-(2-butoxyethoxy) ethanol. The stable solutions of the present invention comprise not less than 10% by weight of (2-(2-butoxyethoxy) ethanol and not less than 3% by weight of a water-soluble organic solubilizer in particularly preferred embodiments.

The solutions generally comprise:
5-40% by weight of anionic dye (reckoned as free acid),
5-40% by weight of 2-(2-butoxyethoxy) ethanol, and
20-90% by weight of water.

Preferred concentrated solutions comprise
10-30% by weight of dye,
10-30% by weight of 2-(2-butoxyethoxy) ethanol, and
40-80% by weight of water.

When the solutions of the present invention additionally comprise solubilizer, the composition of the solutions according to the present invention will generally be
5-40% by weight of anionic dye (reckoned as free acid),
5-40% by weight of (2-(2-butoxyethoxy)ethanol,
3-10% by weight of a water-soluble organic solubilizer, and
10-88% by weight of water.

Preferred concentrated solutions comprise
10-30% by weight of dye,
10-30% by weight of (2-(2-butoxyethoxy)ethanol,
3-6% by weight of a water-soluble organic solubilizer, and
34-77% by weight of water.

The concentrated solutions of the present invention are notable especially for excellent stability in storage and for a low viscosity at room temperature and temperatures below room temperature, for example at 0-5° C. More particularly, the concentrated solutions of the present invention are stable even when they are kept frozen at −20° C. for 2 days and after thawing they remain stable at 0-5° C. or else at 25° C. and at 50° C. for 14 days without any signs of precipitation. The viscosity of the concentrated solutions according to the present invention increases only insignificantly, if at all, when cooling down to just short of freezing, so that they are readily meterable at low temperatures as well as at normal temperatures.

The concentrated dye solutions of the present invention are used, if appropriate after dilution with water, for dyeing and/or printing hydroxyl-containing substrates. More particularly, the solutions of the present invention are used for dyeing paper, including card and board, these materials being dyeable in the pulp, by coating or by dipping for example. Besides, such a liquid formulation can also be used for a continuous or batch dyeing process for textile materials, especially cellulose.

The invention also comprises hydroxyl-containing substrates which have been dyed and/or printed with the present invention's concentrated dye solutions, if appropriate after dilution with water. More particularly, the invention also comprises paper, including card and board, dyed and/or printed with the concentrated dye solutions of the present invention. Besides, such a liquid formulation can also be used for a continuous or batch dyeing process for textile materials, especially cellulose.

In addition, the concentrated dye solutions of the present invention are useful as colorants in aqueous and non-aqueous inkjet inks and also in hotmelt inks.

Inkjet inks comprise in general a total of 0.5 to 15% by weight, and preferably 1.5% to 8% by weight (reckoned dry, i.e. reckoned back to the pure dye content) of one or more of the concentrated dye solutions of the present invention.

Microemulsion inks are based on organic solvents and water with or without an additional hydrotropic substance (interface mediator). Microemulsion inks comprise in general from 0.5% to 15% by weight, preferably from 1.5% to 8% by weight of one or more of the concentrated dye solutions of the present invention, 5% to 99% by weight of water and 0.5% to 94.5% by weight of organic solvent and/or hydrotropic compound.

Solvent-borne inkjet inks comprise preferably 0.5% to 15% by weight of one or more of the concentrated dye solutions of the present invention, 85% to 99.5% by weight of organic solvent and/or hydrotropic compounds.

Hotmelt inks are usually based on waxes, fatty acids, fatty alcohols or sulphonamides which are solid at room temperature and liquefy on heating, the preferred melting range being between about 60° C. and about 140° C. Hotmelt inkjet inks consist for example essentially of 20% to 90% by weight of wax and 1% to 10% by weight of one or more of the concentrated dye solutions of the present invention. They may further include 0% to 20% by weight of an additional polymer (as a dye dissolver), 0% to 5% by weight of dispersing assistant, 0% to 20% by weight of viscosity modifier, 0% to 20% by weight of plasticizer, 0% to 10% by weight of tackifier, 0% to 10% by weight of transparency stabilizer (prevents crystallization of waxes for example) and also 0% to 2% by weight of antioxidant. The concentrated dye solutions of the present invention are further useful as colorants for colour filters, not only for additive but also for subtractive colour production and also as colorants for electronic inks ("e-inks") or electronic paper ("e- paper").

The examples which follow illustrate the invention. All % data in the description and in the examples are to be understood as % by weight, unless otherwise stated.

EXAMPLE 1

400 g of the dye of the formula

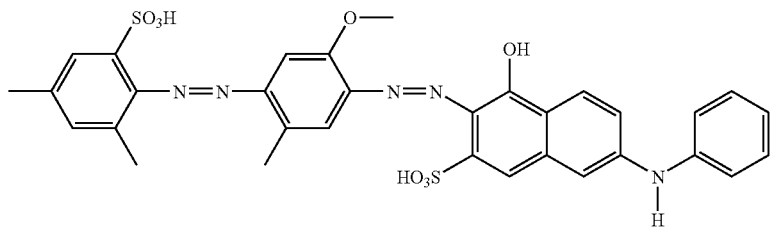

are dissolved in 6000 ml of demineralized water by addition of sufficient triethenolamine for a pH of 8 to 9 and are desalted and concentrated to a weight of 3045 g by membrane filtration at temperatures of 20-50° C., and preferably between 30 and 40° C. and pressures of from 10-40 bar, and more preferably of 20-30 bar.

410 g of concentrated dye solution are then admixed with 75 g of 2-(2-butoxyethoxy) ethanol, 15 g of triethanolamine and 0.75 g of biocide (Proxel GXL™; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is stable in storage in that it neither thickens nor separates under the following conditions: 2 days −20° C. and thawing; 14 days at 0-5° C., at 25° C. and at 50° C.

EXAMPLE 2

410 g of the concentrated dye solution of Example 1 are admixed with 50 g of 2-(2-butoxyethoxy) ethanol, 25 g of triethanolamine and 0.75 g of biocide and diluted to 500 g with demineralized water and stirred until homogeneous.

The solution obtained is stable in storage in that it neither thickens nor separates under the test conditions.

EXAMPLES 3-18

Stable concentrated solutions of the following dyes are preparable in the same way as described in Examples 1 and 2

-continued

| Ex | D | M | KK | B | n |
|---|---|---|---|---|---|
| 8 | 3-HO₃S-C₆H₄-* | *-C₆H₄-* | 4-OH, 3-HO₃S, 7-NH-* naphthalene (attached at 1-position) | H | 1 |
| 9 | 3-methyl-5-SO₃H-C₆H₃-* | *-2,5-dimethyl-C₆H₂-* | 4-OH, 3-HO₃S, 7-NH-* naphthalene | *-C₆H₄ (phenyl) | 1 |
| 10 | 3-methyl-5-SO₃H-C₆H₃-* | *-2-methyl-5-methoxy-C₆H₂-* | 4-OH, 3-HO₃S, 7-NH-* naphthalene | *-C₆H₄ | 1 |
| 11 | 3-HO₃S-C₆H₄-* | *-2-methyl-5-methoxy-C₆H₂-* | 4-OH, 3-HO₃S, 7-NH-* naphthalene | *-C₆H₄ | 1 |
| 12 | 3-HO₃S-C₆H₄-* | *-2-methoxy-5-methyl-C₆H₂-* | 4-OH, 3-HO₃S, 7-NH-* naphthalene | *-C₆H₄ | 1 |
| 13 | 3-methoxy-5-SO₃H-C₆H₃-* | *-2-methoxy-5-methyl-C₆H₂-* | 4-OH, 3-HO₃S, 7-NH-* naphthalene | *-C₆H₄ | 1 |
| 14 | 3,5-dimethyl-(SO₃H)-C₆H₂-* | *-2,5-dimethyl-C₆H₂-* | 4-OH, 3-HO₃S, 7-NH-* naphthalene | *-C₆H₄ | 1 |

-continued

| Ex | D | M | KK | B | n |
|---|---|---|---|---|---|
| 15 | HO₃S-C₆H₄-* | *-C₆H₅-* | 4-OH, 6-HO₃S, 2-NH-* naphthalene (at position with *) | *-NH-triazine-(NH-CH₂CH₂OH)₂ | 1 |
| 16 | HO₃S-C₆H₄-* | *-C₆H₅-* | 4-OH, 6-HO₃S, 2-NH-* naphthalene | *-C(=O)-C₆H₅ (benzoyl) | 1 |
| 17 | HO₃S-C₆H₄-* | *-C₆H₄-SO₃H (ortho) -* | 4-OH, 6-HO₃S, 2-NH-* naphthalene | *-C(=O)-* (carbonyl) | 2 |
| 18 | HO₃S-C₆H₄-* | *-C₆H₄-SO₃H (ortho) -* | 4-OH, 6-HO₃S, 2-NH-* naphthalene | *-triazine with morpholino substituent-* | 2 |

Dyeing Prescription A 70 parts of chemically bleached pinewood sulphite cellulose and 30 parts of chemically bleached birchwood sulphite cellulose are beaten into 2000 parts of water in a hollander. 1.5 parts of the liquid dye preparation of Example 1 are added to the stuff. Paper is made therefrom after a mixing time of 20 minutes. The absorbent paper obtained in this way has a bluish violet colour.

Dyeing Prescription B 1.5 parts of the liquid dye preparation of Example 1 are added to 100 parts of chemically bleached sulphite cellulose beaten with 2000 parts of water in a hollander. After mixing through for 15 minutes, customary sizing is effected using resin size and aluminium sulphate. Paper made from this material exhibits a bluish violet hue in each case.

Dyeing Prescription C

An absorbent web of unsized paper is pulled at 40-50° C. through an aqueous dye solution consisting of 95 parts of water and 5 parts of the inventive dye solution of Example 1.

Excess dye solution is squeezed by two rolls. The dried web of paper has a bluish violet colour in each case.

The dye preparations of Examples 2 to 18 can be used for dyeing similarly to prescriptions A to C.

Dyeing Prescription D 5 parts of the dye preparation of Example 1 are metered into 4000 parts of softened water at room temperature. 100 parts of prewetted woven cotton fabric are introduced into the bath, followed by heating to the boil over 30 minutes. The bath is held at the boil for an hour during which evaporated water is made good from time to time. The dyeing is then removed from the liquor, rinsed with water and dried. The dyeing obtained has a bluish violet colour.

The dye preparations of Examples 2-18 can be used for dyeing cotton in a similar manner.

Dyeing Prescription E 100 parts of freshly tanned and neutralized chrome grain leather are drummed for 30 minutes in a float of 250 parts of water at 55° C. and 0.5 part of the dye preparation made according to Example 1 and are treated for a further 30 minutes in the same bath with 2 parts of an anionic fatliquor based on sulphonated fish oil. The leathers are conventionally dried and finished. The leather obtained has a level scarlet hue.

Further low-affinity, vegetable-retanned leathers can likewise be dyed according to known methods.

Dyeing can be done in a similar manner with the dyes of Examples 2-18.

The invention claimed is:
1. A concentrated aqueous solution, comprising the salt or the free acid or mixtures thereof, of at least one anionic dye of the formula

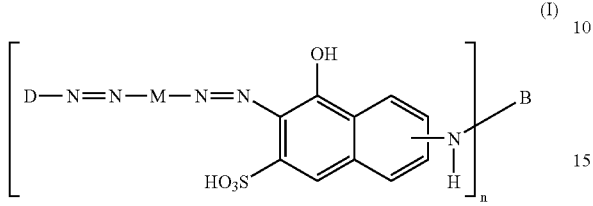

wherein
D is a radical of the formula (a)

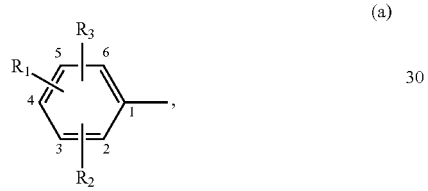

wherein
R$_1$, R$_2$, R$_3$, are independently H; C$_{1-4}$alkyl; C$_{1-4}$alkoxy, —SO$_3$H; —OH or —CN; or independently —SO$_2$—Y or —O—Y, wherein Y is an unsubstituted C$_{1-4}$-alkenyl group or an unsubstituted C$_{1-4}$alkyl group or wherein Y is an NC—, HO—, HOSO$_3$—, halogen-substituted C$_{1-4}$-alkenyl group or an NC—, HO—, HOSO$_3$—, halogen-substituted C$_{1-4}$alkyl group or Y is —NR$_{11}$R$_{12}$ wherein R$_{11}$ and R$_{12}$ are independently H, C$_{1-4}$alkyl or substituted C$_{1-4}$alkyl or combine with the interjacent nitrogen to form a five- or six-membered ring optionally comprising one or two or three heteroatoms, in which case the heterocyclic ring is unsubstituted or the heterocyclic ring is substituted by one or two C$_{1-4}$alkyl groups,
or D is a bicyclic ring system unsubstituted or substituted with C$_{1-4}$alkoxy, —SO$_3$H; —OH or —CN; or independently —SO$_2$—Y or —O—Y, wherein Y is an unsubstituted C$_{1-4}$-alkenyl group or an unsubstituted C$_{1-4}$alkyl group or wherein Y is an NC—, HO—, HOSO$_3$—, halogen-substituted C$_{1-4}$-alkenyl group or an NC—, HO—, HOSO$_3$—, halogen-substituted C$_{1-4}$alkyl group or Y is —NR$_{11}$R$_{12}$ where R$_{11}$ and R$_{12}$ are each as defined above, wherein each of the rings are, optionally, and independently a five-membered or six-membered ring, wherein the five- or six-membered rings, optionally include one or two or three heteroatoms and this bicyclic ring system is not further substituted by substituents attached via azo groups, and M is a bridging phenyl group unsubstituted or substituted by C$_{1-4}$alkyl, C$_{1-4}$alkoxy, hydroxyl, carboxyl, sulpho, cyano or halogen,
and
when n=1, B is hydrogen, an unsubstituted aryl radical, a substituted aryl radical, or a substituted triazine derivative of the formula

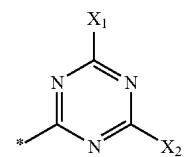

wherein X$_1$ and X$_2$ are independently unsubstituted amine —NH$_2$ or substituted amine —NR$_{21}$R$_{22}$ wherein R$_{21}$ and R$_{22}$ are independently: H, C$_{1-4}$alkyl or substituted C$_{1-4}$alkyl, or combine with the interjacent nitrogen to form a five- or six-membered ring optionally comprising one or two or three heteroatoms, in which case the heterocyclic ring is unsubstituted or the heterocyclic ring is substituted by one or two C$_{1-4}$alkyl groups
or when n=2, B is a bridge of the formula

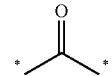

or a bridge of the formula

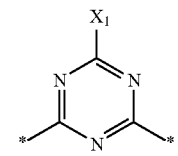

where X$_1$ is defined above
and 2-(2-butoxyethoxy) ethanol.

2. A concentrated aqueous solution according to claim 1, wherein the at least one dye of the formula I is a dye of the formula I'

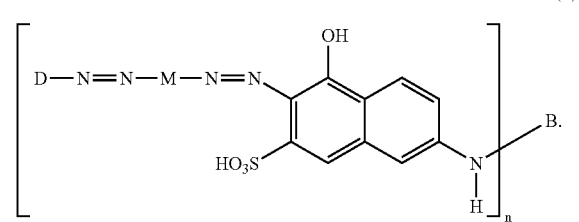

3. A concentrated aqueous solution according to claim 1, wherein

D is a radical of the formula (a')

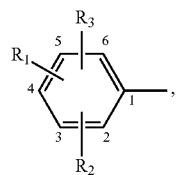

wherein

R$_1$, R$_2$, R$_3$, are independently H; C$_{1-4}$alkyl C$_{1-4}$ alkoxy; —SO$_3$H; —OH or —CN;

M is a bridging phenyl group unsubstituted or substituted by C$_{1-4}$alkyl, C$_{1-4}$alkoxy; sulpho, carboxyl, or hydroxyl and B is H, an unsubstituted phenyl group or substituted phenyl group or a substituted triazine derivative of the formula

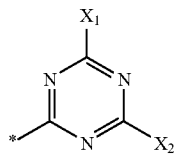

where X$_1$ and X$_2$ are independently as defined above and n=1.

4. A concentrated aqueous solution according to claim 1, wherein the concentrated aqueous solution comprises 5% to 40% by weight of the at least one dye of the formula I, 5-40% by weight of 2-(2-butoxyethoxy) ethanol and 20% to 90% by weight of water.

5. A concentrated aqueous solution according to claim 1, wherein the concentrated aqueous solution comprises 5% to 40% by weight of the at least one dye of the formula I, 5% to 40% by weight of 2-(2-butoxyethoxy) ethanol, 3-10% by weight of a water-soluble organic solubilizer and 10% to 88% by weight of water.

6. A concentrated aqueous solution according to claim 1, wherein the concentrated aqueous solution comprises 10% to 30% by weight of the at least one dye of the formula I, 10% to 30% by weight of 2-(2-butoxyethoxy) ethanol, 3-6% by weight of a water-soluble organic solubilizer and 34% to 77% by weight of water.

7. An inkjet ink comprising at least one concentrated aqueous solution according to claim 1.

8. A method for dyeing and/or printing a hydroxyl-containing substrate comprising the step of contacting at least one concentrated aqueous solution according to claim 1 with the hydroxyl-containing substrate.

9. A hydroxyl-containing substrate dyed and/or printed by the process according to claim 8.

10. A hydroxyl-containing substrate according to claim 9 wherein the hydroxyl-containing substrate is paper.

11. A method for producing an inkjet ink, comprising the step of combining a concentrated aqueous solution according to claim 1, with at least one additional chemical and/or water.

* * * * *